(No Model.)
J. L. YOST.
BICYCLE.
No. 511,395. Patented Dec. 26, 1893.
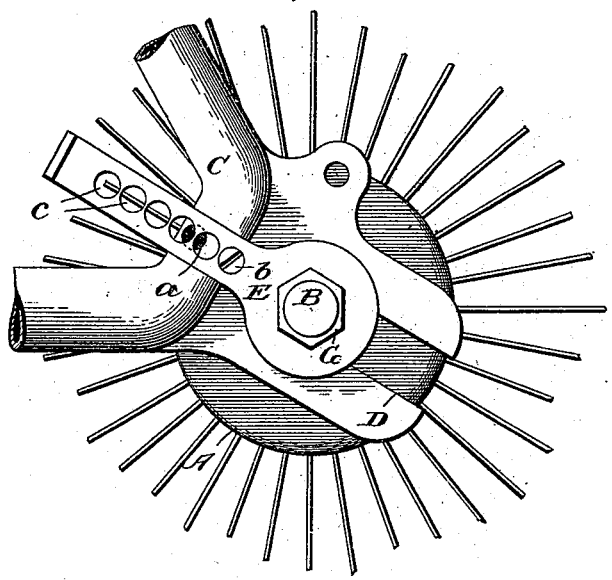
Fig. 1.
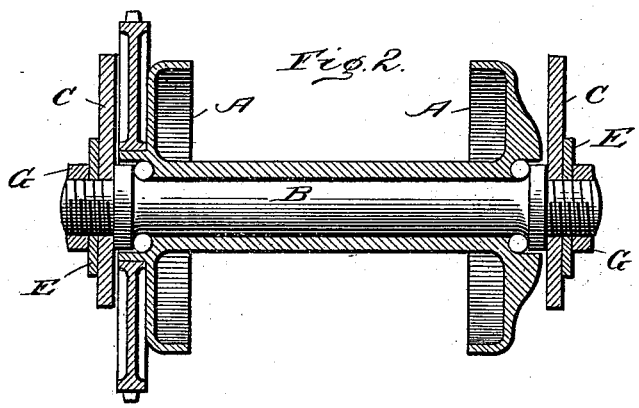
Fig. 2.
Fig. 3.
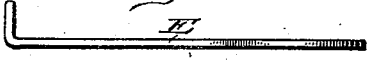
Witnesses
Edwin L. Bradford
Curtis Lammond
Jos. L. Yost  Inventor
By Wm. C. W. Intere
Attorney

UNITED STATES PATENT OFFICE.

JOSEPH L. YOST, OF TOLEDO, OHIO, ASSIGNOR TO THE YOST MANUFACTURING COMPANY, OF SAME PLACE.

BICYCLE.

SPECIFICATION forming part of Letters Patent No. 511,395, dated December 26, 1893.

Application filed April 26, 1893. Serial No. 471,937. (No model.)

*To all whom it may concern:*

Be it known that I, JOSEPH L. YOST, a citizen of the United States, residing at Toledo, in the county of Lucas and State of Ohio, have invented certain new and useful Improvements in Bicycles; and I do hereby declare the following to be a full, clear, and exact description of the invention, such as will enable others skilled in the art to which it appertains to make and use the same.

My invention relates to certain new and useful improvements in bicycles, and particularly to what are known in the art as chain adjustments therefor, and whereby the drive chain which is employed to transmit power and motion from the crank axle to the rear wheel may be kept properly stretched to avoid slipping or from running off the sprockets. Many plans of adjustment have been devised for both longitudinal and lateral adjustment, some known as "forward" and some as "rear" adjustments.

My present invention relates particularly to the latter class, and has for its object to provide a very simple and economic means of adjustment, which may be made with great nicety, and one which can be readily operated without the use of any special tool other than an ordinary screw driver, and one which at the same time shall subserve also the purpose of a washer for the axle nut.

With these ends in view my invention consists in the employment with the rear slotted fork, and the wheel axle located therein, of a metal plate adapted to form a bearing or box for the axle, and provided with a series of holes to receive a set screw by which said plate is secured in position, in combination with a series of screw threaded holes in the frame of the machine, all as will be hereinafter and in detail explained.

In order that those skilled in the art may fully understand my invention I will proceed to describe the construction, arrangement and mode of operation of the same referring by letters of reference to the accompanying drawings, in which—

Figure 1 is a side view of a portion of a bicycle wheel and fork with my adjusting device secured in position. Fig. 2 is a section taken longitudinally of the axle; and Fig. 3 an edge view of the metal plate constituting the adjusting device.

Similar letters of reference denote like parts in the several figures of the drawings.

A represents the hub of the rear wheel of a bicycle and B the axle adapted to be secured in proper relation to the wheel, and preferably with the ordinary ball bearings.

C is the rear fork of the frame which is constructed in the usual or any suitable manner, provided at its rear terminus with a longitudinal open-ended slot or bifurcation D and with two or more threaded screw holes $a$, adapted to receive a set screw $b$.

E is a metal plate having one end enlarged and provided with a hole adapted to receive and form a bearing for the end of the axle B, and the other end extended to form an arm, the extremity of which is turned or bent outwardly to provide means for operating the plate, as clearly shown at Fig. 3.

The arm or extension of the plate E is provided with a series of holes $c$ at any predetermined or variable distances apart and adapted to receive the shank of the set screw $b$. The screw holes $a$ in the frame are so arranged with reference to the screw holes $c$ in the plate that they shall, in any given adjustment between the plate and frame, divide the space between any two of the holes of said plate, and thus afford means for a very nice or fine adjustment and thus take up any slack in the drive chain without making it either too tight or too loose. From the arrangement of holes in the frame and the plate it will be seen that after any given adjustment, if the chain should become loose or lengthened, the slack may be taken up by bringing the next hole in the plate coincident with the hole in the frame from which the screw has been removed, and again securing the screw in place, but if the slack in the chain is not equal to the distance between any two of the holes in the plate E, a finer adjustment may be secured by bringing one of the holes in the plate E into line with the second or auxiliary hole in the frame, and as already described the movement of the plate E may be made to a distance less than the distance between any two of the holes therein.

In the relation of the parts when adjusted, it will be seen that the plate E serves as a washer between the axle nut G, and the fork C, thus dispensing with the ordinary washer. Each end of the axle is provided with a similar adjusting plate and each side of the frame with the screw threaded holes a, so that the axle may be adjusted equally at both ends and thus be always kept "true."

The upturned end of the plate E serves as a ready means by which the plate may be forced backward or forward to secure proper adjustment.

While my invention is designed particularly for use in "rear" adjustments, as described, it will be understood that it may be used at any other locality where its principle of construction and operation may be available.

I am aware that adjusting plates of eccentric and other forms have been used in connection with the axles of bicycles and I do not wish to claim such broadly; but

What I claim as new, and desire to secure by Letters Patent, is—

A chain adjusting mechanism consisting of the plate E, adapted to form a bearing for the axle, and provided with a series of adjusting holes c, in combination with the frame of the bicycle having a series of screw threaded holes a, intermediate to the holes c of the plate E, and a set screw b, all substantially as and for the purposes set forth.

In testimony whereof I affix my signature in presence of two witnesses.

JOSEPH L. YOST.

Witnesses:
M. D. BAKER,
G. F. MILLER.